United States Patent Office 3,313,205
Patented Apr. 11, 1967

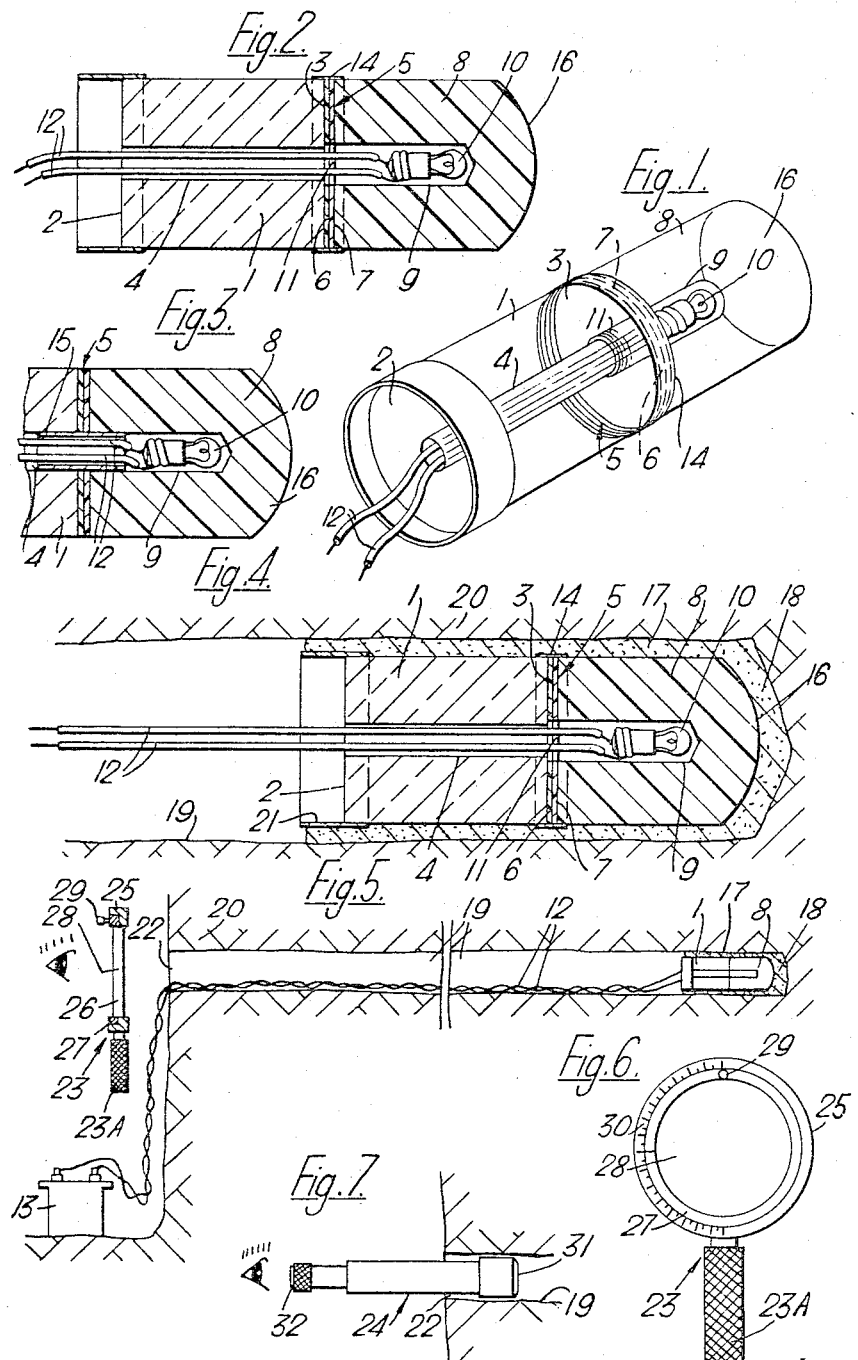
Figure captions: Fig.1, Fig.2, Fig.3, Fig.4, Fig.5, Fig.6, Fig.7
Inventors
Albert Roberts
Ivor Hawkes
Frederick T. Williams
By
Watson, Cole, Grindle & Watson
Attorney

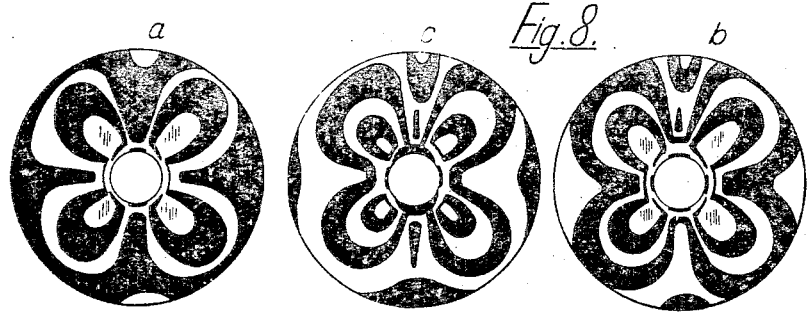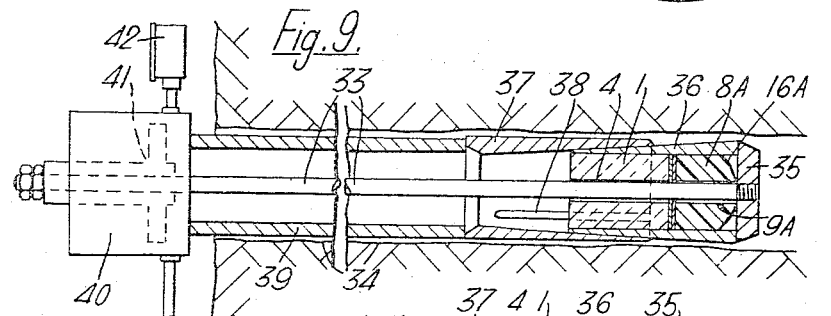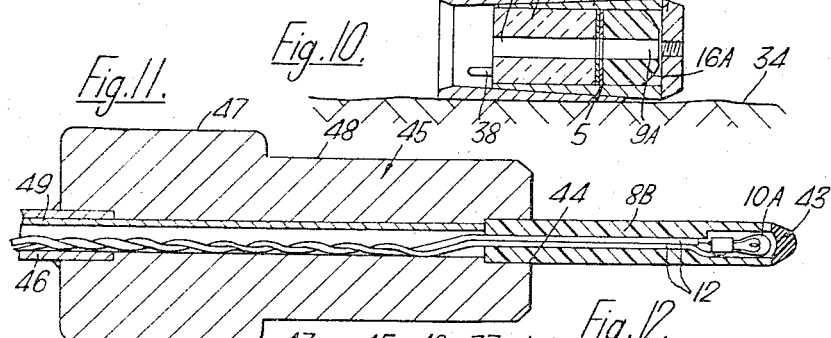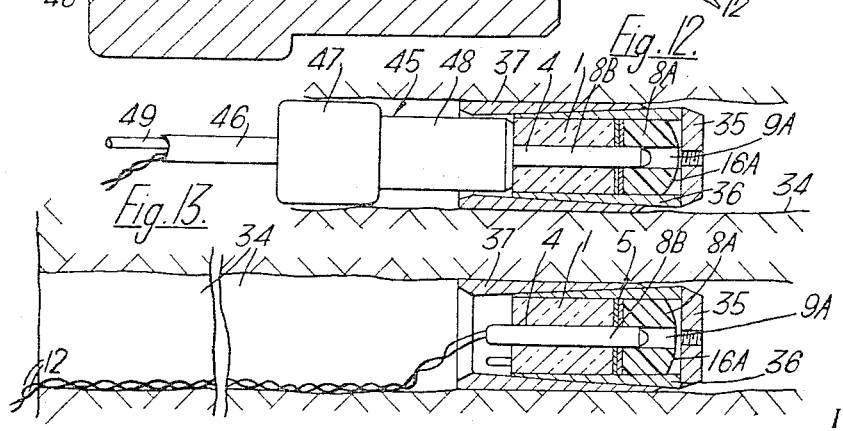

3,313,205
PHOTOELASTIC STRESS INDICATING
DEVICES
Albert Roberts, 1 Abbeydale Park Rise, Totley Rise, Sheffield, and Ivor Hawkes, 25 Wyatt Ave., and Frederick Trevor Williams, 7 Norton Park Drive, both of Sheffield, England
Filed Apr. 30, 1963, Ser. No. 276,808
Claims priority, application Great Britain, May 3, 1962, 17,005/62
6 Claims. (Cl. 88—14)

This invention relates to stress indicating devices by which stress in a material to which such a device is applied can be ascertained, at least as to magnitude, by the application of photoelastic technique.

The object of the invention is to provide a stress indicating device of particular suitability for the detection and measurement of stress in rock structures, such as the structure of rock in mining excavations and in the pillars left in such excavations, and in foundations and other man-made structures, of concrete and/or masonry, and likewise within structures of metal or other manufactured materials.

A further object of the invention is to provide such a stress indicating device capable of detecting and measuring stress deep in the structure to be tested, e.g., at a location far from the surface into which a long bore-hole is formed.

Other objects and advantages of the invention will appear from the following description.

According to the present invention, a stress indicating device comprises a member of birefringent material to be inserted lengthwise in a structure to be tested, a circularly polarising filter mounted at one end of the longitudinal axis of the member, and means disposed beyond the filter to carry a light source.

The member is preferably formed with a hole co-axial with its axis. This hole serves for the passage of leads to an electric lamp constituting the light source. It can also serve for the operation of mounting means that surround the member peripherally.

The member may, however, be mounted by cement in a hole prepared to receive it, e.g., a hole drilled into a rock, concrete, masonry, metal or other solid structure; or it may be mounted in the formation of a structure, e.g., in a cast concrete structure, or in a moulded structure.

Inserted with a close fit in a hole in a structure to be tested with the circularly polarising filter and the light source at the end of the member remote from the mouth of the hole, the member enables to be viewed by the use of an analyser at the mouth of the hole the fringe pattern resulting from the stress arising in the member in response to the stress arising in the surrounding structure and made available at the mouth of the hole by the transmission of polarised light through the member from its remote end. From the fringe pattern thus viewed, the amount and direction of the stress can be ascertained.

The invention will now be further described with reference to the accompanying drawings, in which:

FIGURE 1 is a perspective view of a preferred form of stress indicating device;

FIGURE 2 is an axial section of the device of FIGURE 1;

FIGURE 3 is a fragmentary view of a modification of FIGURE 2;

FIGURE 4 shows, in axial sectional view, the device of FIGURE 1 in position in a structure to be tested;

FIGURE 5 shows, to a smaller scale than FIGURE 4, the device in association with a viewing analyser;

FIGURE 6 is a front view, to a larger scale of the analyser of FIGURE 5;

FIGURE 7 is a fragmentary view of alternative analyser;

FIGURES 8a, 8b, and 8c show examples of typical fringe diagrams produced by use of the device;

FIGURE 9 shows, in axial sectional view, a slightly modified device, together with means for applying and prestressing it;

FIGURE 10 shows the device of FIGURE 1 mounted in pre-stressed condition;

FIGURE 11 shows, to a larger scale than FIGURES 9 and 10, means for inserting a light source in the pre-stressed device;

FIGURE 12 shows the inserting means of FIGURE 11 applied to the device; and

FIGURE 13 shows the pre-stressed device complete with light source.

In FIGURE 1, a birefringent member 1 is of circular section, which is preferable, both because of a principal use of the member for insertion into a necessarily round hole drilled in some existing structure, and because the fringe pattern produced is very readily interpreted. However, the member could be of polygonal or other cross-section. The outer end face 2 and the inner end face 3 of the member are at right-angles to the axis of the member, along which axis is formed a hole 4. To the inner face 3 is cemented a circularly polarising filter 5 consisting of a quarter-wave retardation plate 6 and a linear polarising filter 7. In turn, there is cemented to the filter 7 one end of a solid transparent housing 8 of acrylic resin, or other transparent material of very low optical sensitivity, of the same cross-section as the member 1. An axial hole 9 provides for the mounting and location of a light bulb 10. A hole 11 through the filter 5 provides for the passage of leads 12 from the bulb 10 to a battery 13 (FIGURE 5). A sleeve 14 assists in securing the housing 8 to the member 1. Alternatively, as in FIGURE 3, a tube 15 is inserted as a spigot in the holes 4, 11.

The bulb 10 provides for illumination beyond the filter 5, so that the effect of the illumination is by transmission of light, polarised by the filter 5, lengthwise of the member 1 and through its outer end face 3. For advantageous uniform illumination of the whole cross-section of the member 1, the bulb 10 is at the focus of the parabolically convex end 16 of the housing 8 remote from the member 1 to constitute an integral focussing mirror. The end 16 may have reflecting material applied to its initially, or in the cementing of the whole device in position. FIGURE 4 shows cement 17 surrounding the whole length of this device in a layer produced by pushing the device on to a mass 18 of cement inserted at the inner end of a hole 19 drilled in a rock structure 20, or, it could be, a structure of concrete, masonry, metal, or other solid structure. A sleeve 21 projecting beyond the outer end face 2 of the member 1 ensures that the layer 17 extends over the whole length of the member 1 and yet cannot flow on to the face 2.

Provided that the hole 19 is straight, the device can be viewed from the mouth 22 of the hole (FIGURE 5) at whatever depth of insertion of the device is desired, either by a simple analyser 23 (FIGURES 5 and 6) or by a telescopic analyser 24 (FIGURE 7). In FIGURES 5 and 6, the analyser 23 has a handle 23A by which it may be held, a fixed frame 25 carrying a quarter-wave retardation plate 26 and a rotatable frame 27 carrying a linear polarising filter 28, with a knob 29 to rotate the latter and a scale 30 for measuring the rotation. In FIGURE 7, the analyser telescope 24 carries a quarter-wave retardation plate in a mounting at 31 and a rotatable linear polarising filter in a mounting at 32.

Although the ability to rotate the filter in the analyser is not essential, since in any case fringe patterns as shown by FIGURES 8a, and 8c are immediately visible, it is possible to secure a precise evaluation of stress by rotating the plate until a "standard" fringe pattern corresponding to a known stress (determined by calibration) and noting the percentage rotation necessary to convert the pattern first observed to this standard pattern, when a corresponding proportion is added to (or subtracted from) the standard stress to give the actual stress. Thus, FIGURE 8c is a pattern resulting from stress intermediate of the stresses that would yield "standard" patterns as in FIGURES 8a and 8b; the pattern of FIGURE 8c could be converted into one or other of the patterns of FIGURES 8a and 8b by rotation of the plate in one direction or the other.

In FIGURES 9, 10, 12, and 13, a stress indicating device is as in FIGURES 1 to 4, except that its housing 8A has its hole 9A pass through its parabolic end 16A. This permits the passage through the whole device of a rod 33 that extends to the mouth of a hole 34. The rod 33 is screwed into a stiff disc 35, which bears on the larger inner end of a tapered sleeve 36 into which the stress indicating device fits. Round the sleeve 36 fits a sleeve 37 with an opposite and matching taper, with say four evenly spaced slots 38 (one only shown) from its smaller inner end. To the larger outer end of the sleeve 37 is applied the inner end of a tube 39, which also extends to the mouth of the hole 34. A hydraulic jack 40 bears on the outer end of the tube 39, and the rod 33 is connected to the ram 41 of the jack. By applying pressure to a predetermined amount read on a gauge 42, the rod 33 causes the sleeve 36 to be pushed into the sleeve 37 against the resistance of the tube 39, to expand the sleeve 37 to the wall of the hole 34 and to subject the member 1 of the device inside the sleeve 36 to pre-determined compressive pre-stressing. The jack 40 is removed, and also the tube 39, and the rod 33 is unscrewed from the disc 35 and removed. This leaves the stress indicating device secured in pre-stressed condition (FIGURE 10) at whatever point along the hole 34 to which it had been inserted. It now remains to insert the light source, as follows:

The bulb 10A is contained in a tubular sub-housing 8B of like material to the housing 8A, and is enclosed by a cap 43. The sub-housing 8B fits the holes 4 and 9A of the device. For insertion, the housing 8B has its outer end pushed into a counterbore 44 at the inner end of a plug 45 (FIGURE 11) carried by a tube 46 of a length sufficient for the plug to be pushed to the position (FIGURE 10) of the device. The outer end 47 of the plug 45 is guided by the hole 34, and when the reduced inner end 48 of the plug 45 has entered the sleeve 37, contact of its end face with the outer end face 3 of the member 1 (FIGURE 12) finds the bulb 10A at the focus of the end 16A of the housing 8A, the end 16 being coated with reflecting material. The leads 12 from the bulb 10A pass through the tube 46, inside which there is a half-round sleeve 49, which is held against the outer end of the sub-housing 8B while the tube 46 and the plug 45 are withdrawn from the hole. This leaves the sub-housing 8B in position, and the half-round sleeve 49 can be removed from the hole without interfering with the leads 12, to leave the device, complete with light source, in position (FIGURE 13).

The cement layer 17 (FIGURES 4 and 5) can be of any suitable self-hardening type, to effect embedding of the device in the hole 19, so that the stresses of the surrounding structure 20 are effectively transmitted to the device. Advantageously, however, the cement incorporates metallic powder in such quantity as to produce a mirrored surface at the parabolic end 16 of the housing 8 when the device is forcibly pressed on to the mass 18 of cement.

The double-sleeve mounting of FIGURES 9, 10, 12, and 13 preferably uses relatively soft metal, e.g., brass, aluminium, or white metal, for the sleeve 36 in direct contact with the member 1, and relatively hard metal, e.g., steel, for the slotted outer sleeve 37. When pre-stressed as described above, the member 1 brings about a change in fringe pattern upon any reduction in stress in the surrounding structure, as well as responding to any increase in that stress. The pre-stressing sleeve mounting is therefore preferable where a significant reduction of stress is probable, since no reliance has to be placed on the ability of a mere cement (as in FIGURES 4 and 5) to transmit tension without separating from the member 1.

It is desirable that the birefringent material of the member 1 has a Young's modulus E that is high (preferably at least twice as high) in relation to that of the material of the structure to be tested. Glass is a material that satisfies this condition in the generality of circumstances. Borosilicate glass is particularly preferred. However, other birefringent materials, such as epoxy resin, may be used when the extreme stability of glass is not necessary.

Stability of the member 1 is most desirable when the testing is carried out at intervals over a considerable period of time. Thus, a number of the stress indicating devices may be left in many places distributed over a structure, for periodical inspection. In such case, it is advantageous for the light bulbs 10 or 10A to be removable and replaceable, as a safeguard against failure of any bulb.

Although the insertion and location of a stress indicating device in a hole drilled for the purpose has been described above, it is also possible for a device to be cast in situ, e.g., during the making of a concrete structure or in the moulding of a structure from synthetic plastic, when of course the direct stress-transmitting contact with the member 1 results automatically.

There is virtually no limit to the cross-section of the member 1, and the devices may be made in a series of standard or special sizes for use in accordance with particular requirements. The lower limit of size is dictated by the diameter of hole that can be reliably drilled in the material of a structure, with allowance for the diameter of the hole 11 for the leads 12. Thus, a member 1 of small size could be of 1.25 inches (32 mm.) diameter and 1.5 inches (38 mm.) long, with an axial hole of 0.25 inch (6 mm.).

However, the ratio of length to diameter can be varied according to circumstances, and in some circumstances the length may be so relatively short that the birefringent member amounts to a disc.

The parabolic end 16 or 16A of the housing 8 or 8A provides for the transmission of light from the bulb 10 or 10A by internal reflection into beams parallel to the axis of the member 1 and uniformly distributed over its cross-section and that of the circularly polarising filter 5. However, the housing 8 or 8A could be replaced by a light source mounting that included other focussing means, such as a lens.

Because the availability of inspection at the mouth of the hole 19 or 34 arises because of the use of light transmitted from beyond the member 1 and the filter 5, the distance of the member 1 from the mouth of the hole is of no consequence, provided the hole is sufficiently straight. In addition, it is of little consequence if the member 1 is not precisely co-axial with the hole, whereas any attempt to observe such a device with the aid of light introduced at the mouth of the hole for reflection after passage through the member 1 could result in difficulty of observation because of reflection of much of the light in any case from the outer end of the member 1, and also because of refraction if that outer end were not truly transverse to the axis of the hole.

The invention thus provides for the clear observation at the mouth of a hole of whatever fringe pattern results from the stress in the birefringent material in accordance with the stress in the structural material in which it is embedded. Provided the Young's modulus E of the member 1 is high enough, variations of the modulus of the structural material have no effect on the stress concentration in the member 1.

The magnitude of the stress in the member 1 is directly ascertainable from the fringe pattern, of which examples under a uniaxial system of loading appear in FIGURES 8a, 8b, and 8c. The axes of symmetry of a fringe pattern give the directions of the principal stresses perpendicular to the axis of the hole. The relationship between the two principal stresses defines the system of loading, e.g., whether uniaxial or otherwise, or so nearly uniform as to approximate to the hydrostatic. Moreover, by the compensation provided by a rotary linear polarising filter in the analyser 23 or 24, quite precise measurement of stress magnitude is readily achieved at the time of making an observation.

What we claim is:

1. A stress indicating device for a structure to be tested having a hole therein comprising a longitudinal block of birefringent material having a transverse cross-section to provide a close fit with the cross-section of the hole in the structure to be tested when the block is inserted lengthwise into the hole along the longitudinal axis, a circularly polarizing filter cemented along said axis to one end of the block, a housing secured adjacent the other side of the filter from that of the block, the housing containing a holder for a light source and constituting the inner end of the device to be inserted first into the hole in the structure, a light source, and leads for the light source carried through the filter and the block to the end of the device remote from the housing.

2. A stress indicating device as in claim 1, wherein the housing is of transparent material, with its end remote from the circularly polarizing filter parabolically convex to constitute an internal focusing mirror.

3. A stress indicating device as in claim 1, wherein the block of birefringent material is cylindrical and is formed with a hole throughout its length coaxial with the longitudinal axis, the circularly polarizing filter likewise being formed with a coaxial hole, and the leads for the light source being carried through the filter and the block through said coaxial holes.

4. A stress indicating device as in claim 3, wherein the housing is a cylinder of transparent material of substantially the same diameter as the block of birefringent material, with its end remote from the filter parabolically convex to constitute an internal focusing mirror, the housing being formed with a hole coaxial with said longitudinal axis at least partially of its length extending from the filter and containing the holder for the light source.

5. A stress indicating device for a structure to be tested having a hole therein comprising a cylindrical block of birefringent material, a housing of transparent material of the same diameter as the block secured coaxially to the block, a circularly polarizing filter being secured between the block and the housing, a light source and a holder for the light source being mounted inside the housing, with leads for the light source carried from holder through the filter and the block, the whole for insertion housing foremost with a close fit into said hole in the structure to be tested, an inner sleeve in peripheral contact with the block and the housing, an outer sleeve formed with lengthwise slots surrounding the inner sleeve, the sleeves being oppositely tapered, and means for effecting relative axial movement between the sleeves so as to secure the device in the hole in the structure with prestressing of the birefringent material.

6. A stress indicating device as in claim 5, wherein the outer sleeve is of relatively hard material and the inner sleeve, in contact with the block and the housing, is of relatively soft metal.

References Cited by the Examiner

UNITED STATES PATENTS 2,415,436   2/1947   Maris _____ 88—14

JEWELL H. PEDERSEN, *Primary Examiner.*

A. A. KASHINSKI, *Assistant Examiner.*